E. H. REINHART.
DIRIGIBLE HEADLIGHT FOR AUTOMOBILES.
APPLICATION FILED JULY 17, 1917.
1,266,626.
Patented May 21, 1918.
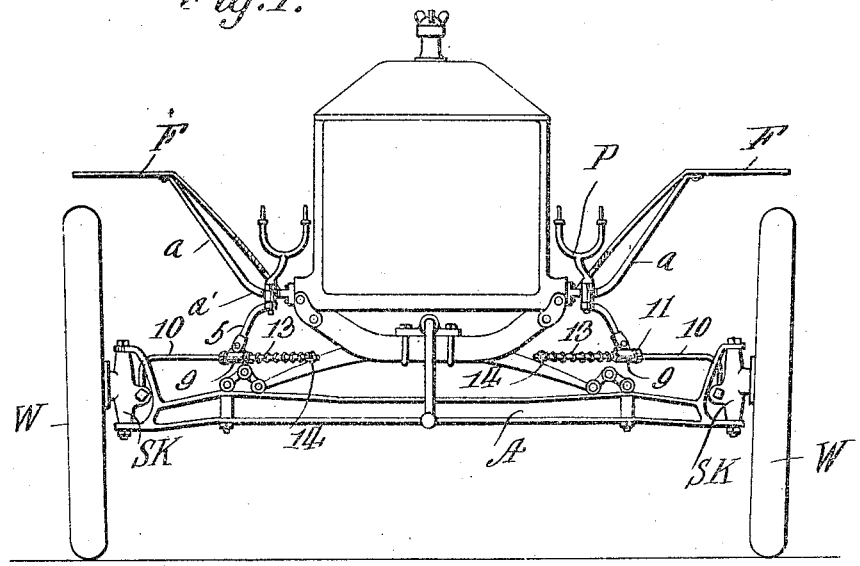
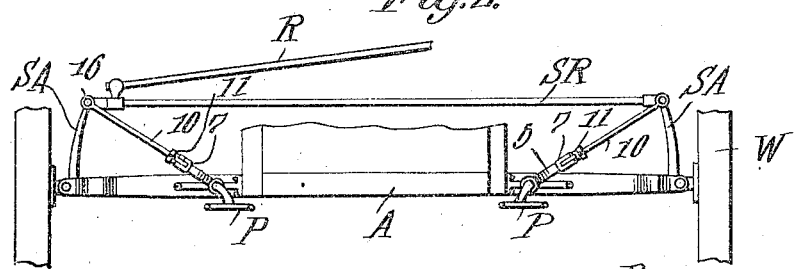
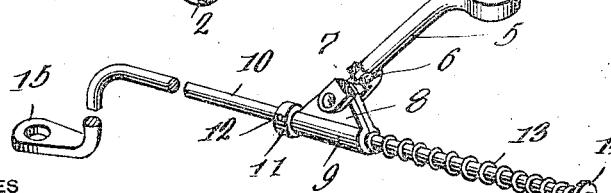
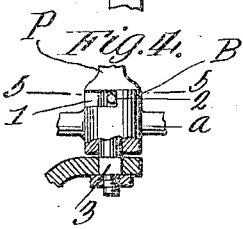
WITNESSES
Guy M. Spring
S. M. M^cColl
INVENTOR
Earl H. Reinhart
BY Richard B. Owen
ATTORNEY

UNITED STATES PATENT OFFICE.

EARL H. REINHART, OF SHELL LAKE, WISCONSIN.

DIRIGIBLE HEADLIGHT FOR AUTOMOBILES.

1,266,626.   Specification of Letters Patent.   Patented May 21, 1918.

Application filed July 17, 1917. Serial No. 181,136.

*To all whom it may concern:*

Be it known that I, EARL H. REINHART, a citizen of the United States, residing at Shell Lake, in the county of Washburn and State of Wisconsin, have invented certain new and useful Improvements in Dirigible Headlights for Automobiles, of which the following is a specification.

This invention relates to dirigible headlights for automobiles.

The primary object of the invention is to control the angular movement of one of the lamps by means of the steering mechanism when the car is making a turn leaving the other stationary so that the lamp on the inner side or the side toward which the turn is being made is moved about its vertical axis by the turning of the steering wheels. The rays from this lamp will light up the road over which the inner turning wheel will pass and the other lamp which remains stationary will light up the path of the outer turning wheel by casting its rays in a direction straight ahead.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a front elevation of a portion of an automobile showing this improvement applied, Fig. 2 is a plan view with parts broken out, Fig. 3 is a detail perspective view of the mechanism constituting this invention, Fig. 4 is a detail side elevation of the lamp socket with parts broken out and in section, and Fig. 5 is a horizontal section taken on the line 5—5 of Fig. 4.

In the embodiment illustrated, a portion of a Ford automobile is depicted to which the attachment constituting this invention is applied, although it is to be understood that the attachment may be applied to various other motor vehicles. The portion of the car illustrated embodies the front axle A to the ends of which the steering knuckles SK are pivoted, said knuckles having the front wheels W journaled thereon. These knuckles are provided with the usual steering arms SA connected by a transverse steering rod SR to which the rod R which leads to the steering wheel is connected. The fenders F are shown provided with the usual supporting arms *a*, each of which is provided with the usual angularly disposed portion *a'* which is provided with an apertured boss or bearing B in which the lamp post P is designed to rotate. As shown, the bearing B has a segmental slot 1 in its side wall through which projects a pin 2 carried by the post P and which is designed to limit the turning movement of the lamp in opposite directions. The free end of this lamp post P is made angular in cross section as shown at 3 to adapt it to fit rigidly within the angular opening 4 formed in an arm 5 and which constitutes a portion of the attachment comprising this invention. This arm 5 is swiveled at its free end as shown at 6 to a bifurcated connector or coupling 7. The end of the arm 5 which is engaged with the connector 7 is reduced with a shoulder formed at its base which bears against the end of the connector as is shown clearly in Fig. 3. This bifurcated connector 7 straddles an arm 8 and is pivotally connected therewith, the pivot passing through the free ends of the furcations of said connector and through said arm 8. This arm 8 is carried by a sleeve 9 which encircles and turns loosely on a rod 10, being held in position on said rod by a collar 11 secured to the rod by a set screw 12 and at its opposite end by a coiled spring 13 disposed between the sleeve and a nut 14 on the end of the rod. The other end of this rod 10 is offset laterally and the terminal thereof is flattened and apertured to form an attaching arm 15. This arm 15 is pivotally mounted on a bolt 16 which connects one end of the steering rod SR with the steering arm SA as is shown clearly in Fig. 2.

While one of these lamp turning attachments only has been described it is to be understood that two are employed, one at each side of the car and that they are exactly alike, and hence it is deemed necessary only to describe one in detail.

When the parts are disposed in the position shown in Figs. 1 and 2, the lamps which are supported on the posts P, and not here shown, may be individually turned, and it will be obvious that when the steering wheel at the right of the car is turned toward the right that the lamp at that side will be correspondingly turned while the lamp at the left of the car will remain stationary and throw its light directly ahead of the car while the light which is turned will throw its light in the direction in which the wheel is turned and vice versa, when the wheel at the left of the car is turned, the lamp on that side will be correspondingly turned while the one at the right of the car will remain stationary. When the wheels are turned to normal position, that is, in alinement with the rear wheels, for the straight ahead movement of the car, the springs 13 will return the lamps to normal position and they will throw their light directly in advance of the car.

It will thus be seen that with an attachment constructed as herein described and shown that the pathway directly in front of the car will be lighted as well as that in the direction in which it is being turned.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim :—

1. In a dirigible headlight for automobiles, the combination with a vehicle having steering wheels, a connection between said wheels to cause them to turn in unison, a rotatably mounted lamp post, an arm fixed at one end to said post, a rod loosely connected at one end with said wheel connection, a member mounted for sliding movement on said rod, a coiled spring on said rod to yieldably retain said member against movement in one direction, and a coupling pivotally engaged with said member and swiveled to said arm.

2. In a dirigible headlight for automobiles, the combination with a vehicle having steering wheels, a connection between said wheels to cause them to turn in unison, a rotatably mounted lamp post, an arm fixed at one end to said post, a rod loosely connected at one end with said wheel connection, a member mounted for sliding movement on said rod, a stop on said rod against which said sliding member abuts, a coiled spring on said rod exerting its tension against said member to hold it yieldably in engagement with said stop, and a coupling pivotally engaged with said member and swiveled to said arm.

3. In a dirigible headlight for automobiles, the combination with a vehicle having steering wheels, a connection between said wheels to cause them to turn in unison, a rotatably mounted lamp post, an arm fixed at one end of said post, a rod loosely connected at one end with said wheel connection and having a sleeve loosely mounted thereon, a collar secured to said rod and abutting one end of said sleeve, a coiled spring on said rod exerting its tension against the other end of said sleeve, and a coupling pivotally engaged with said sleeve and swiveled to said arm.

4. The combination with a vehicle having a pair of steering wheels, a rod connecting said wheels to cause them to turn in unison, a rotatably mounted lamp post, a rod having an offset end connected with said wheel connecting rod, a sleeve loose on said rod and having a laterally extending lug, a stop on said rod against which said sleeve abuts, a nut adjustable on the free end of said rod, a coiled spring on said rod between said nut and the other end of said sleeve, an arm fixed at one end to said post, and a coupling pivoted at one end to said sleeve lug and swiveled at its other end to said arm.

In testimony whereof I affix my signature in presence of two witnesses.

EARL H. REINHART.

Witnesses:
W. J. KNAPP,
WM. HUERTH.